United States Patent
Mantell et al.

(10) Patent No.: US 10,500,792 B2
(45) Date of Patent: Dec. 10, 2019

(54) SYSTEM AND METHOD FOR ROLL ALIGNMENT OF A MULTI-NOZZLE EXTRUDER IN THREE-DIMENSIONAL OBJECT PRINTERS USING CROSS-PROCESS MEASUREMENTS

(71) Applicant: Xerox Corporation, Norwalk, CT (US)

(72) Inventors: David A. Mantell, Rochester, NY (US); Christopher G. Lynn, Wolcott, NY (US); Mark A. Cellura, Webster, NY (US); Peter J. Nystrom, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 170 days.

(21) Appl. No.: 15/661,711

(22) Filed: Jul. 27, 2017

(65) Prior Publication Data
US 2019/0030819 A1 Jan. 31, 2019

(51) Int. Cl.
| B29C 64/393 | (2017.01) |
|---|---|
| B29C 64/106 | (2017.01) |
| B29C 64/209 | (2017.01) |
| B29C 47/30 | (2006.01) |
| B29C 47/92 | (2006.01) |

(Continued)

(52) U.S. Cl.
CPC ............ *B29C 64/393* (2017.08); *B29C 48/30* (2019.02); *B29C 48/302* (2019.02); *B29C 48/345* (2019.02); *B29C 48/92* (2019.02); *B29C 64/106* (2017.08); *B29C 64/209* (2017.08); *G05B 19/4099* (2013.01); *B29C 2948/92076* (2019.02); *B29C 2948/92409* (2019.02); *B29C 2948/92571* (2019.02); *B29C 2948/92904* (2019.02); *B33Y 10/00* (2014.12);

(Continued)

(58) Field of Classification Search
CPC ... B29C 64/393; B29C 64/209; B29C 64/106; B29C 48/345; B29C 48/302; B29C 48/92; B29C 48/30; B29C 2948/92904; B29C 2948/92409; B29C 2948/92076; B29C 2948/92571; B33Y 50/02; B33Y 30/00; B33Y 10/00; G05B 19/4099; G05B 2219/49007
See application file for complete search history.

(56) References Cited

U.S. PATENT DOCUMENTS

| 6,626,511 B2 | 9/2003 | Riou |
|---|---|---|
| 7,837,298 B2 | 11/2010 | Van De Wynckel et al. |

(Continued)

FOREIGN PATENT DOCUMENTS

WO 2016/085965 A1 6/2016

*Primary Examiner* — M. N. Von Buhr
(74) *Attorney, Agent, or Firm* — Maginot Moore & Beck LLP

(57) ABSTRACT

A method for identifying an angle of roll for a multi-nozzle extruder includes moving the extruder in a first process direction to form a first set of swaths of extrusion material using two nozzles in the extruder and moving the extruder in a second process direction to form a second set of swaths of extrusion material. The method further includes identifying a location of one nozzle relative to the other nozzle in two dimensions based on cross-process direction distances between the first and second sets of swaths and identifying the angle of extruder roll for the extruder based on the location of the one nozzle and a predetermined geometry of the extruder.

18 Claims, 5 Drawing Sheets

(51) Int. Cl.
*B29C 47/12* (2006.01)
*B33Y 10/00* (2015.01)
*B33Y 30/00* (2015.01)
*B33Y 50/02* (2015.01)
*G05B 19/4099* (2006.01)
*B29C 48/30* (2019.01)
*B29C 48/92* (2019.01)
*B29C 48/345* (2019.01)

(52) U.S. Cl.
CPC ............... *B33Y 30/00* (2014.12); *B33Y 50/02* (2014.12); *G05B 2219/49007* (2013.01)

(56) References Cited

U.S. PATENT DOCUMENTS

| | | | |
|---|---|---|---|
| 8,322,821 | B2 | 12/2012 | Tsai et al. |
| 8,562,101 | B2 | 10/2013 | Calamita et al. |
| 8,727,473 | B2 | 5/2014 | Calamita |
| 8,931,877 | B1 | 1/2015 | Rodriguez et al. |
| 9,067,445 | B2 | 6/2015 | Donaldson |
| 9,168,685 | B2 | 10/2015 | Swanson et al. |
| 9,233,507 | B2 | 1/2016 | Bibas |
| 9,415,546 | B2 * | 8/2016 | Conrow ................ B29C 64/386 |
| 9,586,424 | B2 * | 3/2017 | Campbell ............. B41J 25/001 |
| 9,840,075 | B1 * | 12/2017 | Mu ...................... B41J 2/04543 |
| 9,956,799 | B1 * | 5/2018 | Manchester ........... B41J 29/393 |
| 10,166,769 | B2 * | 1/2019 | Mu ...................... B41J 2/04543 |
| 10,291,816 | B2 * | 5/2019 | Mizes .................. B29C 64/393 |
| 10,335,991 | B2 * | 7/2019 | Mandel ................ B29C 48/02 |
| 2002/0089556 | A1 | 7/2002 | Riou |
| 2010/0245455 | A1 * | 9/2010 | Mizes .................... B41J 2/2135 347/19 |
| 2013/0155140 | A1 | 6/2013 | Calamita et al. |
| 2014/0242208 | A1 | 8/2014 | Elsworthy |
| 2015/0210011 | A1 | 7/2015 | Conrow et al. |
| 2015/0367375 | A1 | 12/2015 | Page |
| 2016/0271873 | A1 * | 9/2016 | Albert .................. B29C 67/245 |
| 2016/0325498 | A1 | 11/2016 | Gelbart |
| 2017/0157844 | A1 * | 6/2017 | Mandel ................ B29C 64/106 |
| 2018/0111336 | A1 * | 4/2018 | Mantell ................ B29C 64/106 |
| 2019/0030805 | A1 * | 1/2019 | Mantell ................ B29C 64/232 |

* cited by examiner

US 10,500,792 B2

SYSTEM AND METHOD FOR ROLL ALIGNMENT OF A MULTI-NOZZLE EXTRUDER IN THREE-DIMENSIONAL OBJECT PRINTERS USING CROSS-PROCESS MEASUREMENTS

CROSS REFERENCE

This application cross-references copending U.S. patent application Ser. No. 15/66,1810, which is entitled "System And Method For Alignment Of A Multi-Nozzle Extruder In Three-Dimensional Object Printers," and was filed on Jul. 27, 2017, the entire contents of which are incorporated herein by reference.

TECHNICAL FIELD

This disclosure is directed to extruders used in three-dimensional object printers and, more particularly, to alignment of extruders that include multiple nozzles.

BACKGROUND

Three-dimensional printing, also known as additive manufacturing, is a process of making a three-dimensional solid object from a digital model of virtually any shape. Many three-dimensional printing technologies use an additive process in which an additive manufacturing device forms successive layers of the part on top of previously deposited layers. Some of these technologies use extrusion printing in which an extruder emits a melted build material, such as heated and softened ABS plastic, in a predetermined pattern. The printer typically operates the extruder to form successive layers of the build material that form a three-dimensional printed object with a variety of shapes and structures. While many printers employ an extruder that includes a single nozzle to emit the melted material, some extruders include multiple nozzles.

Multi-nozzle extruders include arrays of two or more nozzles that emit at least one type of extrusion material from a single extruder. In some multi-nozzle extruder embodiments, each nozzle is connected to a valve that opens and closes to activate and deactivate individual nozzles dynamically during an additive manufacturing process. Multi-nozzle extruders improve the speed of additive manufacturing processes compared to older single-nozzle extrusion devices while also enabling the three-dimensional object printer to form the extrusion material with high-resolution structures. However, multi-nozzle extruders also require more precise alignment than single-nozzle extruders to maintain the proper alignment between multiple nozzles that are arranged in a two-dimensional array in the extruder. Properly aligned nozzles emit the extrusion material in predetermined locations to ensure that the patterns of extruded materials from multiple nozzles do not overlap each other or have unexpectedly large gaps between different sets of extrusion material from the different nozzles in the extruder. However, misalignment of the nozzles in a multi-nozzle extruder may occur due to an undesirable rotation or "roll" in the extruder that often occurs during operation of three-dimensional object printer. Consequently, improvements to three-dimensional object printers that enable the detection and correction of extruder roll would be beneficial.

SUMMARY

In one embodiment, a method for operating a three-dimensional object printer to identify roll in a multi-nozzle extruder has been developed. The method includes moving, with a first actuator, a multi-nozzle extruder in a first process direction within a print zone of the three-dimensional object printer, operating at least a first nozzle and a second nozzle in a plurality of nozzles in the multi-nozzle extruder to emit a first swath and a second swath, respectively, of an extrusion material onto a surface of a receiving member in the print zone during the moving of the multi-nozzle extruder in the first process direction, moving, with the first actuator, the multi-nozzle extruder in a second process direction within the print zone of the three-dimensional object printer, the second process direction being different than the first process direction, operating at least the first nozzle and the second nozzle in the plurality of nozzles in the multi-nozzle extruder to emit a third swath and a fourth swath, respectively, of the extrusion material onto the surface of the receiving member in the print zone during the moving of the multi-nozzle extruder in the second process direction, generating, with an optical sensor, scanned image data of the first swath, the second swath, the third swath, and the fourth swath, identifying, with a controller, a measured two-dimensional location of the second nozzle relative to the first nozzle with reference to a first location of the second nozzle in a first cross-process direction corresponding to a location of the second swath relative to the first swath in the scanned image data, the first cross-process direction being perpendicular to the first process direction, and a second location of the second nozzle in a second cross-process direction corresponding to a location of the fourth swath relative to the third swath in the scanned image data, the second cross-process direction being perpendicular to the second process direction, and identifying, with the controller, an angle of roll for the multi-nozzle extruder with reference to the measured two-dimensional location of the second nozzle relative to the first nozzle and a predetermined geometric arrangement of the first nozzle and the second nozzle in the multi-nozzle extruder.

In another embodiment, a three-dimensional object printer that identifies roll of a multi-nozzle extruder has been developed. The three-dimensional object printer includes a multi-nozzle extruder including a plurality of nozzles, a first actuator configured to move the multi-nozzle extruder in a first process direction and a second process direction within a print zone of the three-dimensional object printer, the second process direction being different than the first process direction, an optical sensor, and a controller operatively connected to the multi-nozzle extruder, the first actuator, and the optical sensor. The controller is configured to move the multi-nozzle extruder in the first process direction using the first actuator, operate at least a first nozzle and a second nozzle in the plurality of nozzles in the multi-nozzle extruder to emit a first swath and a second swath, respectively, of an extrusion material onto a surface of a receiving member in the print zone during the moving of the multi-nozzle extruder in the first process direction, move the multi-nozzle extruder in the second process direction using the first actuator, operate at least the first nozzle and the second nozzle in the plurality of nozzles in the multi-nozzle extruder to emit a third swath and a fourth swath, respectively, of the extrusion material onto the surface of the receiving member in the print zone during the moving of the multi-nozzle extruder in the second process direction, generate scanned image data of the first swath, the second swath, the third swath, and the fourth swath using the optical sensor, identify a measured two-dimensional location of the second nozzle relative to the first nozzle with reference to a first location of the second nozzle in a first cross-process direction corresponding to a location of the second swath relative to the first swath in the scanned image data, the first cross-process direction being perpendicular to the first process direction, and a second location of the second nozzle in a second cross-process direction corresponding to a location of the fourth swath relative to the third swath in the scanned image data, the second cross-process direction being perpendicular to the second process direction, and identify an angle of roll for the multi-nozzle extruder with reference to the measured two-dimensional location of the second nozzle relative to the first nozzle and a predetermined geometric arrangement of the first nozzle and the second nozzle in the multi-nozzle extruder.

BRIEF DESCRIPTION OF THE DRAWINGS

The foregoing aspects and other features of three-dimensional object printers with multi-nozzle extruders are explained in the following description, taken in connection with the accompanying drawings.

DETAILED DESCRIPTION

Figure 1:
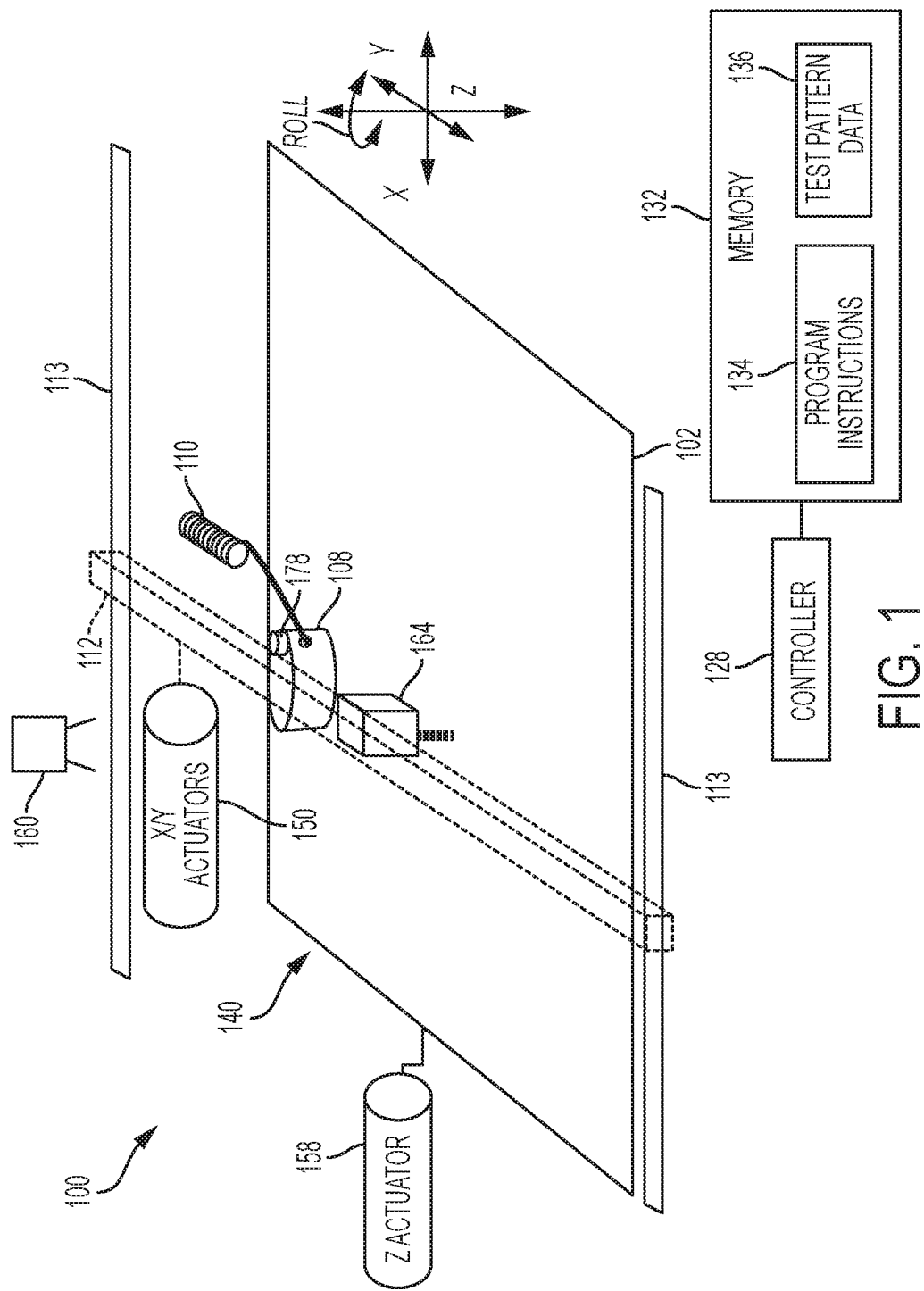
FIG. 1 is a schematic diagram of a three-dimensional object printer that includes a multi-nozzle extruder.

For a general understanding of the environment for the device disclosed herein as well as the details for the device, reference is made to the drawings. In the drawings, like reference numerals designate like elements.

As used herein, the term "extrusion material" refers to a material that one or more nozzles in an extruder emit to form layers of material that either form an object or provide structural support for the object during operation of a three-dimensional object printer. As described in further detail below, the printer is further configured to form predetermined arrangements of the extrusion material using different nozzles in a multi-nozzle extruder to form predetermined test patterns to enable the printer to identify angular deviations in the orientation of the extruder. The extrusion materials include, but are not strictly limited to, both "build materials" that form permanent portions of the three-dimensional printed object and "support materials" that form temporary structures to support portions of the build material during a printing process and are then optionally removed after completion of the printing process. Examples of build materials include, but are not limited to, acrylonitrile butadiene styrene (ABS) plastic, polylactic acid (PLA), aliphatic or semi-aromatic polyamides (Nylon), plastics that include suspended carbon fiber or other aggregate materials, electrically conductive polymers, other thermoplastics, and any other form of material that is suitable for emission through the nozzles of an extruder in a liquid or semi-liquid form and then for solidification to form a durable three-dimensional printed object. Examples of support materials include, but are not limited to, high-impact polystyrene (HIPS), polyvinyl alcohol (PVA), and other extrudable materials.

As used herein, the terms "multi-nozzle extruder" or "extruder" are used below interchangeably and refer to a component of a three-dimensional object printer that melts extrusion material in a single fluid chamber and provides the melted extrusion material to multiple nozzles in an on-demand manner to form swaths of the extrusion material during a three-dimensional printing operation. As described in more detail below, in some embodiments a valve assembly in the extruder enables the simultaneous operation of multiple nozzles to extrude the extrusion material at different times during the printing operation. In other embodiments, the multi-nozzle extruder does not include valves and instead controls the operation of individual extruders by activating or deactivating a supply of extrusion material to the individual extruder nozzles by, for example, activating and deactivating a motor that feeds a filament of the extrusion material to each nozzle. Multi-nozzle extruders incorporate two or more nozzles that extrude the extrusion material simultaneously or at different times during a three-dimensional object printing process.

As used herein, the term "nozzle" refers to an orifice in an extruder that extrudes a liquid or semi-liquid extrusion material during a three-dimensional printing operation to form extruded patterns of the extrusion material corresponding to a path of relative movement between the extruder and the receiving surface. During operation, the nozzle extrudes a substantially continuous linear arrangement of the melted material along the process path of the extruder. The extruder controls a rate at which the nozzle extrudes the extrusion material. Some extruder embodiments include valves to activate and deactivate the emission of extrusion material from individual nozzles. The diameter of the orifice in the nozzle affects the width of the extruded line of extrusion material. Different extruder embodiments include nozzles having a range of orifice sizes with wider orifices producing wider arrangements of the extrusion material while narrower orifices producing narrower arrangements of the extrusion material. As described in more detail below, some multi-nozzle extruder embodiments include a plate or other planar member that includes a linear one-dimensional or a two-dimensional arrangement of nozzles.

Multi-nozzle extruders include an array of nozzles that are located at predetermined positions to extrude elongated "swaths" of the extrusion material onto a receiving member in predetermined arrangements. The receiving member is a flat planar surface, such as a metal plate or other suitable member, which receives the arrangements of extruded material from the nozzles in the extruder. During operation, the extruder moves along at least one, and in some embodiments more than one, process direction axis within a print zone to form various arrangements of the swaths of extrusion material during both an additive manufacturing process and during an extruder registration process that identifies and corrects an angular roll in the extruder. As used herein, the term "process direction" refers to the direction of movement of the extruder relative to a receiving member in a print zone as one or more nozzles in the extruder emit the extrusion material to form swaths in a printed test pattern or a three-dimensional printed object in an additive manufacturing process. In some three-dimensional printer embodiments the extruder moves in more than one process direction to form different portions of a test pattern or an object during an additive manufacturing process. As used herein, the term "cross-process direction" refers to an axis that is perpendicular to the process direction. As described in further detail below, a three-dimensional object printer identifies and corrects the effects of extruder roll in a multi-nozzles extruder based on the relative cross-process direction locations of swaths of the extrusion material that the extruder forms in a predetermined test pattern while the extruder moves in at least two different process directions in a two-dimensional plane of a print zone of the printer, which may be a horizontal plane or a plane on a different orientation to enable the multi-nozzle extruder to form patterns of extrusion material on a surface of a support member in the print zone.

As used herein, the term "pressure chamber" refers to a cavity formed within a housing of an extruder that holds a supply of liquefied extrusion material and supplies the liquefied extrusion material to one or more nozzles in the extruder during a three-dimensional object printing operation. The pressure chamber is further configured to maintain a predetermined level of pressure on the liquid extrusion material to control a rate at which one or more nozzles extrude the extrusion material onto a receiving surface. In some embodiments, an external feed system for the build material that is connected at an inlet of the pressure chamber supplies liquefied build material under pressure to maintain the predetermined pressure level within the pressure chamber during operation of the extruder. As described in more detail below, because some extruders include multiple nozzles that are activated and deactivated on an individual basis using valves, the pressure chamber supplies liquefied extrusion material so that any activated nozzles in the extruder emit the extrusion material at a substantially constant rate even as the number of activated nozzles changes during a printing operation.

As used herein, the term "arrangement of extrusion material" refers to any pattern of the extrusion material that the extruder forms on a receiving surface during a three-dimensional object printing operation. Common arrangements of extrusion material include straight-line linear arrangements of the extrusion material and curved arrangements of the extrusion material. The three-dimensional object printer forms various structures using combinations of different arrangements of the extrusion material. Additionally, in some configurations a digital controller in the three-dimensional object printer operates the extruder and the individual nozzles in the extruder to form a predetermined test pattern that includes specific arrangements of the extruded materials with a predetermined structure. A three-dimensional object printer performs automated image analysis of the printed test pattern to identify the angle of roll of the extruder along at least one axis of motion for the extruder.

As used herein, the term "swath" refers to a straight-line or curved arrangement of extrusion material that an extruder nozzle extrudes onto on a region of a receiving surface within the boundaries of extrusion material that forms an outline around the region. As described in more detail below, an extruder uses two or more extrusion nozzles to form swaths of extrusion material to form one or more layers of extrusion material during a three-dimensional object printing operation.

As used herein, the term "process direction" refers to a direction of relative movement between an extruder and a receiving surface that receives extrusion material from one or more nozzles in the extruder. The receiving surface is either a receiving member that holds a three-dimensional printed object or a surface of the partially formed three-dimensional object during an additive manufacturing process. In the illustrative embodiments described herein, one or more actuators move the extruder in the print zone, but alternative printer embodiments move the receiving member to produce the relative motion in the process direction while the extruder remains stationary.

As used herein, the term "cross-process direction" refers to an axis that is perpendicular to the process direction. The process direction and cross-process direction refer to the relative path of movement between the extruder and the surface that receives the extrusion material. In some configurations, the extruder includes an array of nozzles that extend along the cross-process direction with a predetermined distance in the cross-process direction between adjacent nozzles in the extruder.

As used herein, the terms "angle of roll" or more simply "roll" as applied to a multi-nozzle extruder refer to an angle of rotation for the extruder about an axis that extends perpendicularly from the face of the extruder that includes the nozzles that emit the extrusion material. The extruder has a predetermined angular roll orientation which places the nozzles in the correct relative locations to produce swaths of the extrusion material along two or more process directions. The predetermined angular roll orientation is referred to numerically as 0° roll or as "zero roll" for illustrative purposes herein, which indicates that the extruder is properly aligned to perform additive manufacturing processes in a three-dimensional object printer. In addition to an extruder that has a precise 0° angle of roll, an extruder with a zero roll orientation may have an angle of roll that is not precisely 0° but is within a predetermined operational range of the 0° angle to be considered to have a correct roll alignment for various printer configurations.

FIG. 1 depicts a three-dimensional object printer ("printer") 100 that is configured to operate an extruder to form three-dimensional printed objects. The printer 100 includes a receiving member 102, a multi-nozzle extruder 108, extruder support arm 112, controller 128, memory 132, X/Y actuators 150, a Z actuator 158, an extruder roll adjustment actuator 178, a camera 160, and an optional displacement sensor 164. In the printer 100, the X/Y actuators 150 move the extruder 108 to different locations in a two-dimensional plane (the "X-Y plane") along the X and Y axes to extrude patterns of the extrusion material that forms one layer in a three-dimensional printed object. For example, in FIG. 1 the X/Y actuators 150 translate the support arm 112 and extruder 108 along guide rails 113 to move along the Y axis while the X/Y actuators 150 translate the extruder 108 along the length of the support arm 112 to move the extruder along the X axis. The actuators 150 move the extruder 108 in different process directions within a print zone 140 located over a surface of the receiving member 102 to enable the extruder 108 to form patterns of extruded material on the surface of the receiving member 102.

The support arm 112 includes a support member and one or more actuators that move the extruder 108 during printing operations. In the printer 100, one or more actuators 150 move the support arm 112 and extruder 108 along the X and Y axes during the printing operation. For example, one of the actuators 150 move the support arm 112 and the extruder 108 along the Y axis while another actuator moves the extruder 108 along the length of the support arm 112 to move along the X axis. In the printer 100, the X/Y actuators 150 optionally move the extruder 108 along both the X and Y axes simultaneously along either straight or curved paths. The controller 128 controls the movements of the extruder 108 in linear paths that enable the nozzles in the extruder 108 to extrude patterns of the extrusion material onto the receiving member 102. To form a predetermined test pattern of the extrusion material, the controller 128 moves the extruder 108 in a rasterized process direction motion along the perpendicular X and Y axes.

In the printer 100, the Z actuator 158 controls the distance between the extruder 108 and the receiving member 102 along the Z axis to ensure that the nozzles in the extruder 108 remain at a suitable height to extrude extrusion material onto an object during the printing process. In the printer 100, the X/Y actuators 150, and the Z actuator 158 are embodied as electromechanical actuators, such as electric motors, stepper motors, or any other suitable electromechanical device.

The receiving member 102 is a planar member, such as a glass plate, polymer plate, or foam surface, which receives patterns of the extrusion material including test patterns or layers of a three-dimensional printed object during operation of the printer 100. The extruder 108 includes a housing that surrounds a plurality of nozzle. When activated, each nozzle extrudes extrusion material onto the surface of the receiving member 102 or a surface of a partially formed object. The individual nozzles in the extruder 108 are each coupled with valves that can activate and deactivate the flow of the extrusion material through the nozzles in the extruder 108 on an individual basis. In the example of FIG. 1, the extrusion material supply 110 includes a spool of ABS plastic or another suitable extrusion material filament that unwraps from the spool to supply extrusion material to the extruder 108. In the illustrative embodiment of FIG. 1, the single extrusion material supply 110 provides extrusion material to a single pressure chamber within the extruder 108 that supplies melted extrusion material to each of the nozzles in the extruder 108. In alternative embodiments, the extrusion material supply 110 provides multiple filaments of extrusion material to different nozzles in a multi-nozzle extruder.

In the printer 100, the camera 160 generates one or more digital photographs of the surface of the receiving member 102 in the print zone 140 including test patterns of the extrusion material that are formed on the surface of the receiving member 102. Each digital photograph includes a two-dimensional array of scanned image data in the form of digital pixels that capture the structure of different swaths in the test pattern on the surface of the receiving member 102. The camera 160 is one embodiment of an optical sensor that generates digital scanned image data of test patterns formed from the extrusion material on the surface of the receiving member 102. However, in alternative embodiments a linear optical sensor in the print zone 140 or a separate flatbed scanner that scans over the receiving member 102 generates the scanned image data as a series of one-dimensional scanlines of scanned image data.

In the printer 100, the displacement sensor 164 is, for example, a laser range finder, optical range finder, or other device that measures a distance along the Z axis between the predetermined location of the displacement sensor 164 and the surface of the receiving member 102 and any patterns of extrusion material that are formed on the receiving member 102. In the embodiment of FIG. 1, the displacement sensor 164 is a single "point" displacement sensor that generates height measurement data corresponding to a small portion of the receiving member 102 or a swath of extrusion material that is formed on the receiving member 102. The optical sensor 164 is mounted on the support arm to enable the X/Y actuators 150 to move the displacement sensor 164 over the surface of the receiving member 102 with rasterized motion that is similar to the motion of the extruder 108 to enable the displacement sensor 164 to generate height profile data for any structure that is formed on the surface of the receiving member 102. In another embodiment, the displacement sensor 164 is configured as a linear sensor with multiple sensing elements that measure the heights of multiple locations along a linear portion of print zone 140. As described in more detail below, in some embodiments the displacement sensor 164 generates measurement data that enables the controller 128 to identify the height of different patterns of extrusion material along the Z axis.

In the printer 100, the camera 160 and the displacement sensor 164 are both embodiments of an optical sensor that generate scanned image data of swaths of the extrusion material that are formed on the surface of the receiving member 102. In some embodiments the camera 160 and the displacement sensor 164 are both components in an optical sensor that generates two-dimensional scanned image data and height profile data for swaths of extrusion material that are formed on the surface of the receiving member 102.

The extruder 108 includes a plurality of nozzles that are fluidly coupled to an internal pressure chamber (not shown) within the housing of the extruder 108. Individual values, such as needle valves, fluidly couple the nozzles to the pressure chamber. During operation, the valves open and close to control the extrusion of material through each of the nozzles individually. In the printer 100, the extruder 108 extrudes material onto the surface of the receiving member 102 in predetermined patterns while the X/Y actuators 150 move the extruder 108 in different process directions along the X and Y axes in the print zone 140.

Figure 3:
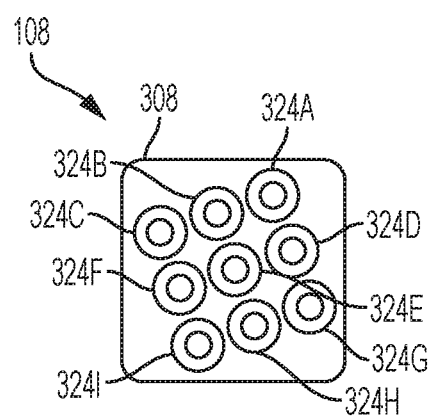
FIG. 3 is an illustration of nozzles in an embodiment of a multi-nozzle extruder.

FIG. 3 depicts an illustration and schematic diagram of the multi-nozzle extruder 108 of FIG. 1 in more detail. In the illustrative embodiment of FIG. 3, the extruder 108 includes a total of nine (9) nozzles 324A-324I that are located in a predetermined geometric arrangement, which is a 3×3 staggered two-dimensional array in the illustrative embodiment of FIG. 3. The nozzles 324A-324I in the extruder 108 are arranged with a uniform pattern of separations in a housing 308 of the extruder 108. The extruder 108 includes a plurality of valves where each valve is connected to one of the nozzles 324A-324I and to the pressure chamber in the extruder 108. During operation, the valves open and close to enable all of the nozzles or any subset of the nozzles to extrude the extrusion material onto the surface of the receiving member 102.

In the printer 100, the extruder 108 moves in the print zone 140 along two different process direction axes X and Y, although in other embodiments the extruder 108 moves along only one axis or more than two axes during an additive manufacturing process in the printer 100. The nozzles in the extruder 108 are aligned to enable all of the extrusions to form parallel adjacent swaths of the extrusion material with little or no gaps between the adjacent swaths.

Referring again to FIG. 1, the actuator 178 is an electromechanical actuator such as a stepper motor or other suitable device that rotates the extruder 108 about the Z axis shown in FIG. 1 to adjust the roll of the extruder. FIG. 1 depicts the ROLL rotation about the Z axis for illustrative purposes. The controller 128 operates the actuator 178 to reduce or eliminate a roll deviation of the extruder 108 from the predetermined zero roll orientation that places all of the nozzles in the extruder 108 in correctly registered relative locations. Once properly registered, the nozzles in the extruder 108 emit swaths of the extrusion material to avoid overlapping adjacent swaths of the extrusion material or producing unintentional gaps between adjacent swaths of the extrusion material during operation of the three-dimensional object printer 100.

In the printer 100, the controller 128 is a digital logic device such as a microprocessor, microcontroller, field programmable gate array (FPGA), application specific integrated circuit (ASIC) or any other digital logic that is configured to operate the printer 100. In the printer 100, the controller 128 is operatively connected to one or more actuators that control the movement of the receiving member 102 and the support arm 112. The controller 128 is operatively connected to the extruder 108 to control operation of the plurality nozzles in the extruder 108 and to the actuator 178 to rotate the extruder 108 about the Z axis to correct identified errors in the extruder roll. The controller 128 is operatively connected to the camera 160 to control the operation of the camera 160 to generate scanned image data of arrangements of the extrusion material in predetermined test patterns that the extruder 108 forms on the surface of the receiving member 102. The controller 128 is operatively connected to the displacement sensor 164 to enable the controller 128 to monitor a height of patterns of the extruded material on the surface of the receiving member 102.

The controller 128 is also operatively connected to a memory 132. In the embodiment of the printer 100, the memory 132 includes volatile data storage devices, such as random access memory (RAM) devices, and non-volatile data storage devices such as solid-state data storage devices, magnetic disks, optical disks, or any other suitable data storage devices. The memory 132 stores programmed instruction data 134 and test pattern image data 136. The controller 128 executes the stored program instructions 134 to operate the components in the printer 100 to form predetermined test patterns using the nozzles in the multi-nozzle extruder 108. The controller 128 also executes the stored program instructions 134 to identify an angle of roll for the extruder 108 along one or more axes of motion for the extruder 108 in the print zone 140, and optionally to operate actuators that are operatively connected to the extruder 108 to rotate the extruder 108 about the Z axis to return the extruder 108 to a zero roll orientation. The test pattern image data 136 includes, for example, a predetermined set of patterns for swaths that the nozzles in the extruder 108 form on the surface of the receiving member 102 to enable the controller 128 to identify the angle of roll for the extruder 108 using scanned image data of swaths that the extruder 108 forms as the extruder 108 moves in at least one two different process directions. The controller 128 operates the actuators to move the extruder 108 and activates and deactivates different nozzles in the extruder 108 to form arrangements of the extrusion material in different portions of a predetermined test pattern.

Figure 2:
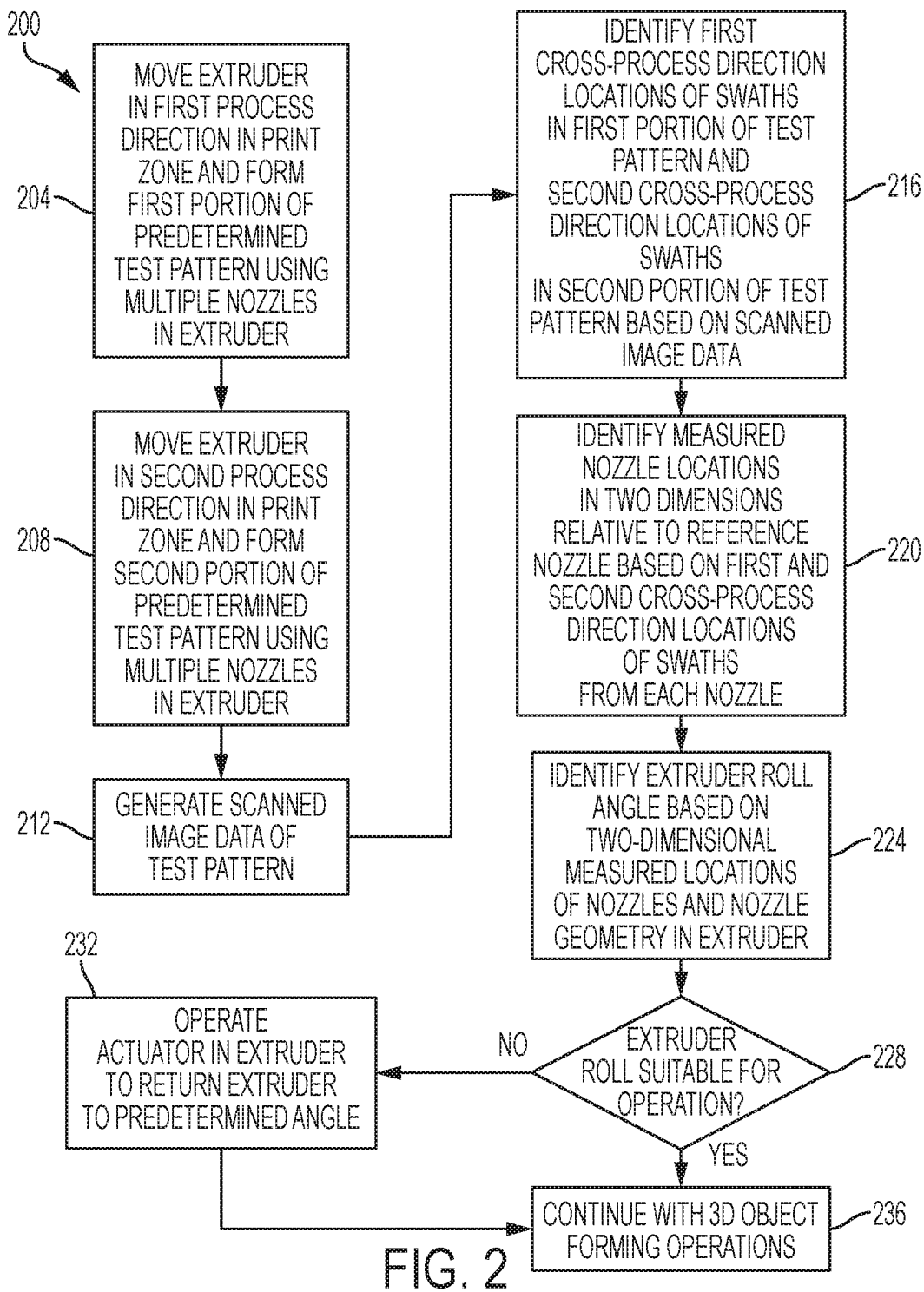
FIG. 2 is a block diagram of a process for identifying and correcting a roll misalignment in a multi-nozzle extruder.

FIG. 2 depicts a process 200 for operation of a three-dimensional object printer to identify an angle of roll for a multi-nozzle extruder in a print zone of the three-dimensional object printer. The process 200 is described in conjunction with the three-dimensional object printer 100 of FIG. 1 for illustrative purposes.

Process 200 begins as the printer 100 moves the extruder 108 in a first process direction in the print zone to form a first portion of a predetermined test pattern (block 204). In the printer 100, the controller 128 operates the X/Y actuators to move the extruder 108 in the first process direction while activating and deactivating the individual nozzles in the extruder 108 to form the first portion of the test pattern from the extrusion material on the surface of the receiving member 102. The controller 128 uses the test pattern image data 136 to control the movement of the extruder 108 and the operation of the individual nozzles in the extruder 108 to form the predetermined portion of the test pattern from the extrusion material.

The process 200 continues as the printer 100 moves the extruder 108 in a second process direction in the print zone to form a second portion of the predetermined test pattern (block 208). In the printer 100, the controller 128 operates the X/Y actuators to move the extruder 108 in the second process direction while activating and deactivating the individual nozzles in the extruder 108 to form the second portion of test pattern from the extrusion material on the surface of the receiving member 102. The controller 128 uses the test pattern image data 136 to control the movement of the extruder 108 and the operation of the individual nozzles in the extruder 108 to form the predetermined portion of the test pattern from the extrusion material.

Figure 4A:
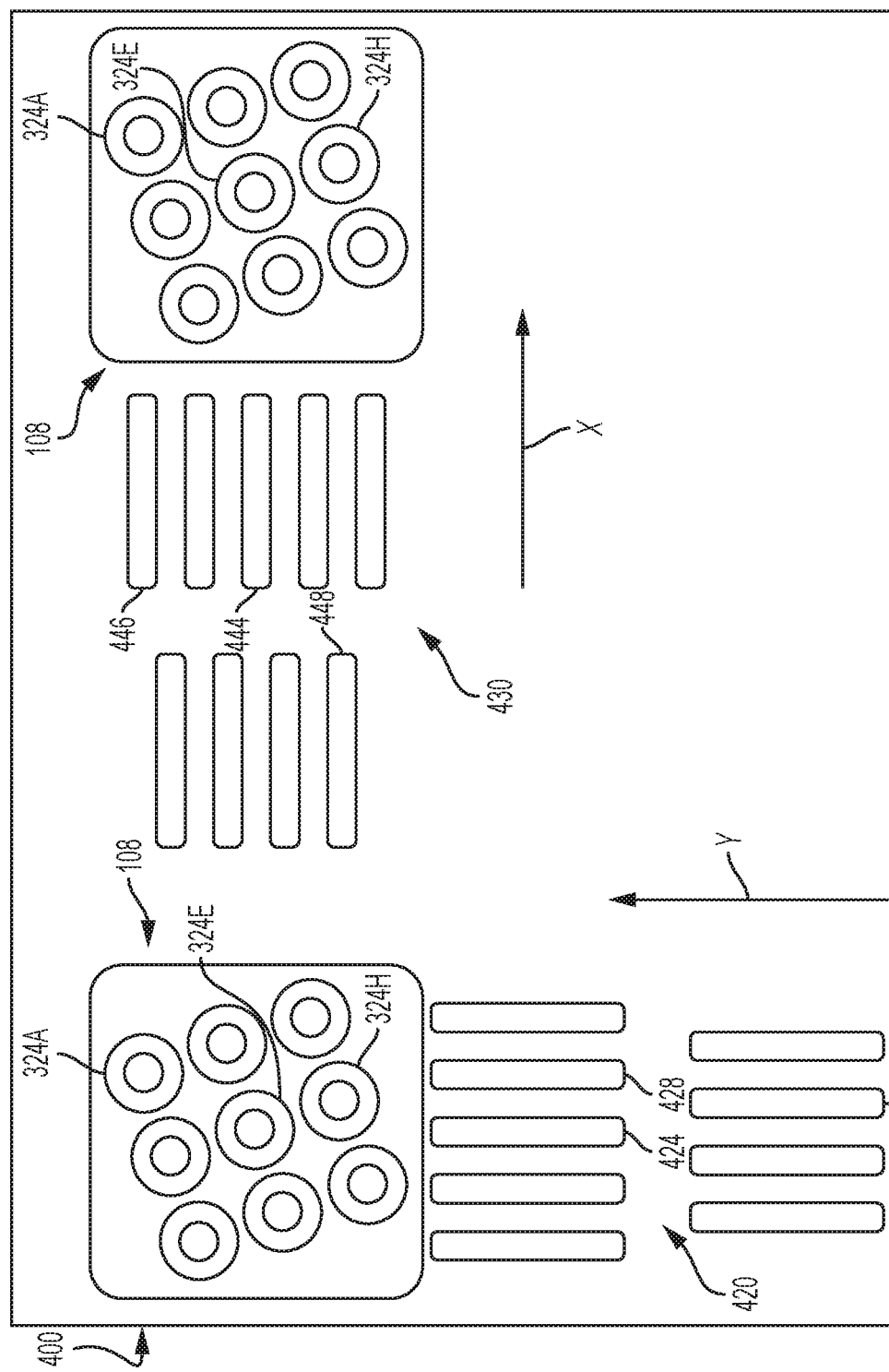
FIG. 4A is a schematic view of a printed test pattern formed by the multi-nozzle extruder of the printer in FIG. 1 in a configuration where the multi-nozzle extruder is aligned with zero roll in the print zone.
Figure 4B:
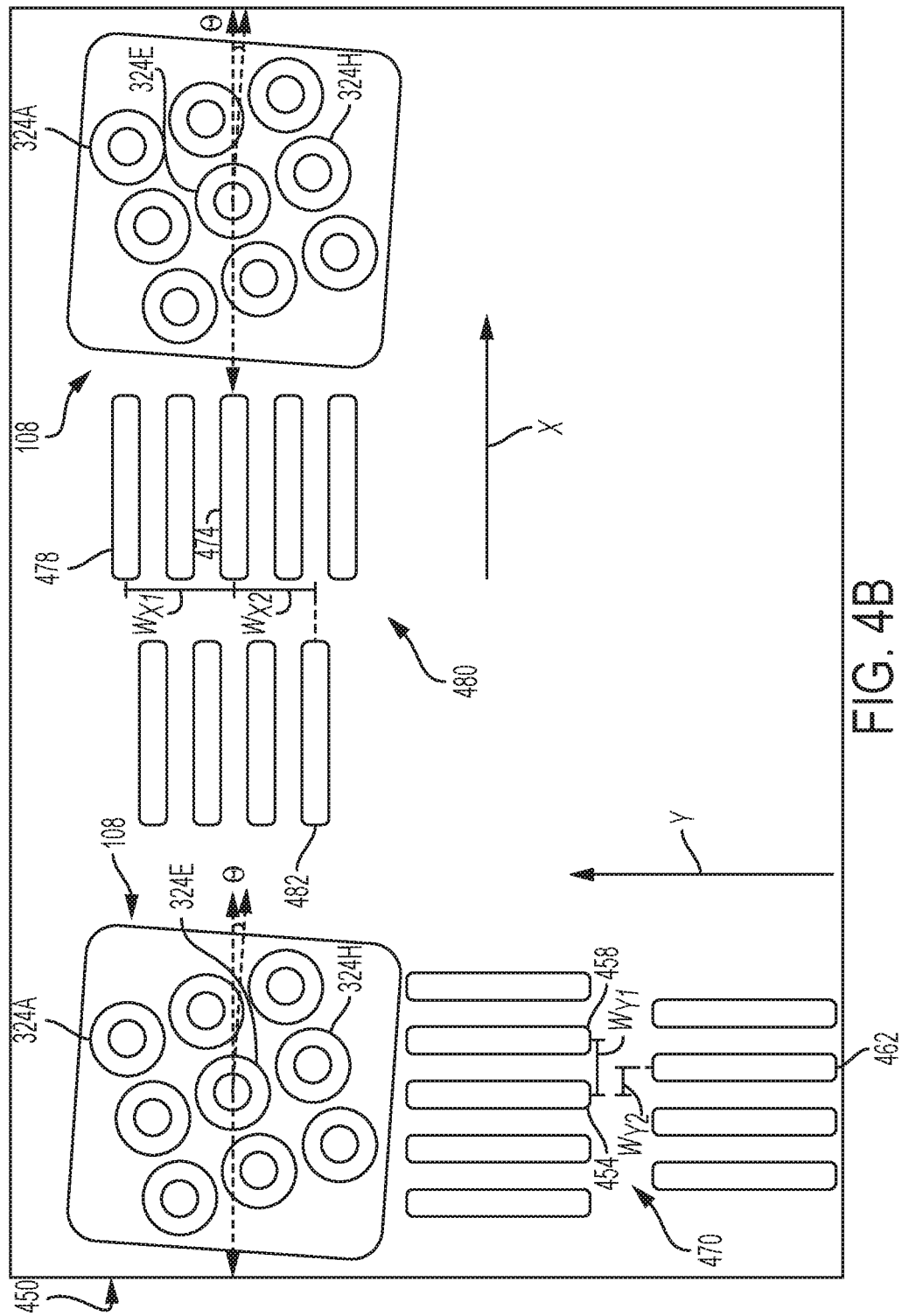
FIG. 4B is a is a schematic view of another printed test pattern formed by the multi-nozzle extruder of the printer in FIG. 1 in a configuration where the multi-nozzle extruder has a non-zero angle of roll in the print zone.

FIG. 4A and FIG. 4B depict an illustrative embodiment of test patterns 400 and 450 that the printer 100 forms during the process 200 in more detail. In FIG. 4A, the extruder 108 is properly registered with zero roll about the Z axis. In the configuration of FIG. 4A, the extruder 108 produces a test pattern in which all of the swaths of extruded material in the test pattern are located at uniform distances from each other in the cross-process direction as the extruder 108 forms swaths of the extrusion material along X and Y process direction axes.

To form the test pattern 400, the extruder 108 moves in two different process directions along two different perpendicular axes (X and Y) to form the swaths in each portion of the test pattern. The test pattern 400 includes a first portion 420 that includes an arrangement of swaths with each swath being formed by a single nozzle in the extruder 108 as the extruder 108 moves along the first process direction on the Y axis. For example, the swaths 424, 428, and 432 correspond to the nozzles 324E, 324A, and 324H, respectively. The test pattern 400 also includes a second portion 430 that includes an arrangement of swaths with each swath being formed by a single nozzle in the extruder 108 as the extruder 108 moves along the second process direction on the X axis. For example, the swaths 444, 446, and 448 correspond to the nozzles 324E, 324A, and 324H, respectively. The test pattern 400 depicts a configuration in which the extruder 108 is in a properly aligned or "registered" position in the print zone 140. In the printer 100, the extruder 108 is properly registered when the rotational position of the extruder 108 places locations of the nozzles 324A-324I in the extruder 108 at uniform distances from each other along two different cross-process directional axes, which are depicted as the X and Y axis in FIG. 4A.

The test pattern 450 in FIG. 4B includes the same structure as the test pattern 400 from FIG. 4A, but depicts the effects of extruder roll (angle θ) upon the relative cross-process direction locations of swaths in the test pattern 450 in a configuration in which the extruder 108 experiences a roll misalignment. The rotation of the extruder 108 by the angle θ changes the relative alignments of different nozzles in the extruder 108 along the cross-process direction axes. The changes to the relative positions of the nozzles affect the relative cross-process direction locations of swaths in both a first portion 470 of the printed test pattern 450 that is formed along the Y axis and a second portion 480 of the printed test pattern 450 that is formed along the X axis. In particular, when the extruder 108 experiences roll, the changes in the positions of the two-dimensional arrangement of nozzles in the extruder 108 increase the cross-process direction distances that separate some of the nozzles and the corresponding swaths that are formed by each nozzle while the roll reduces the cross-process direction distances that separate other nozzles in the extruder. During the process 200, the controller 128 uses a single nozzle and the swaths of extrusion material that are emitted from the single nozzle in the extruder 108 as a "reference nozzle" in the extruder 108. The controller 128 identifies the locations of other nozzles in the extruder 108 relative to the position of the reference nozzle based on the relative cross-process direction locations of swaths that the extruder 108 forms while moving in two or more different process directions in the print zone 140, such as the process directions X and Y that are depicted in FIG. 4A and FIG. 4B. In the embodiments described herein, the controller 128 uses the nozzle 324E in the extruder 108 as a reference nozzle, but any of the nozzles 324A-324I in the extruder 108 are suitable for use as the reference nozzle in alternative configurations of the process 200.

As depicted in FIG. 4B, using the nozzle 324E in the extruder 108 as a reference location, the angle of roll $\theta$ moves the nozzle 324A farther away from the nozzle 324E along the cross-process direction in the first portion 470 of the printed test pattern 450 compared to the expected cross-process direction separation between these nozzles when the extruder 108 is properly aligned. In the test pattern 450, the cross-process direction distance $W_{Y1}$ between the swath 454 from the reference nozzle 324E and the swath 458 from the nozzle 324A is greater than the cross-process direction distances between the corresponding swaths 424 and 428 in the test pattern 400 of FIG. 4A because the extruder roll misalignment $\theta$ changes the relative positions of the nozzles 324E and 324A along the cross-process direction. Similarly, the extruder roll affects the cross-process direction distance between the reference nozzle 324E and the nozzle 324H. However, due to the position of the nozzle 3234H in the extruder 108, the same extruder roll $\theta$ decreases the relative cross-process direction distance between the nozzles 324E and 324H in the first portion 470 of the test pattern 450 relative to the separation between these nozzles in the test pattern 400.

As described above, the extruder roll $\theta$ affects the cross-process direction distances that separate nozzles in the extruder 108 and the swaths that are formed by the nozzles in the test patterns 400 and 450. However, the variations in the separation between swaths are also affected by the particular process direction that the printer 100 uses to form different portions of the printed test pattern. For example, in the second portion 480 of the test pattern 450, the extruder 108 moves along the X axis process direction that is arranged at a 90° angle relative to the Y axis process direction in the print zone 140. The extruder 108 experiences the same extruder angle of roll $\theta$ along the X axis, but the two-dimensional arrangement of nozzles in the extruder produce swaths that have different locations relative to the reference nozzle in the second process direction along the X axis than in the first process direction along the Y axis. As depicted in FIG. 4B, the angular roll $\theta$ of the extruder 108 decreases the cross-process direction distance $W_{X1}$ between the reference nozzle 324E and the nozzle 324A while increasing the cross-process direction distance $W_{X2}$ between the nozzle 324E and the nozzle 324H compared to the same arrangement of nozzles that are depicted in FIG. 4A. The printer 100 identifies the cross-process locations of the nozzles 324A and 324H relative to the reference nozzle 324E in the second portion of the test pattern 480 based on the cross-process direction locations of the swaths 478 and 482 that correspond to the nozzles 324A and 324H, respectively, and the swath 474 that corresponds to the reference nozzle 324E. While FIG. 4A and FIG. 4B depict the relationships between the reference nozzle 324E and the nozzles 324A and 324H in greater detail for illustrative purposes, the extruder roll $\theta$ similarly affects the cross-process direction locations of all the nozzles in the extruder 108 and the corresponding swaths of extrusion material that are formed in the test patterns 400 and 450.

As described in more detail below, during the process 200 the printer 100 identifies the locations of one or more nozzles in the extruder relative to the reference nozzle (e.g. the nozzle 324E) in two-dimensions using the relative cross-process direction distances that separate swaths in the printed test pattern along both of the process direction axes to identify the relative locations of the nozzles in two dimensions. The identification of the relative nozzle locations in two dimensions enables the controller 128 to identify the direction and magnitude of the angle of roll $\theta$ for the extruder 108. Based on the two-dimensional locations of one or more nozzles in the extruder relative to the reference nozzle, the controller 128 identifies the extruder angle of roll. In some instances, the extruder 108 is properly registered (e.g. the angle of roll $\theta$ is 0° or within a predetermined operational tolerance range of 0°), such as in the configuration of FIG. 4A, while in other instances, the controller 128 identifies the direction and magnitude of the angle of roll $\theta$ that is outside of the predetermined operational range, such as the roll $\theta$ that is depicted in FIG. 4B.

While the test patterns 400 and 450 of FIG. 4A and FIG. 4B depict a single swath formed by each nozzle of the extruder 108 for each of the two process directions X and Y, in other embodiments the extruder 108 emits a series of swaths of the extrusion material in a predetermined pattern using each nozzle to reduce the effects of small randomized errors in the structure of the extruded material. Additionally, in some embodiments the printer 100 does not operate all of the nozzles in the extruder 108 to form the test pattern. For example, in a simplified embodiment the printer 100 generates a measurement of extruder roll using swaths that are formed by a single reference nozzle and at least one additional nozzle in the multi-nozzle extruder, although using all or a large number of the nozzles to form the test pattern may improve the accuracy of detecting the extruder roll in some embodiments. Furthermore, while the X and Y axes are orthogonal to each other (e.g. arranged at 90° angles in the print zone 140), in other embodiments the printer 100 forms the printed test pattern with swaths of the extrusion material that are formed along two or more non-orthogonal axes, such as forming different arrangements of the swaths that are separate by 45°, 30°, 15°, etc. angles other than a 90° angle.

Referring again to FIG. 2, the process 200 continues as the printer 100 generates scanned image data of the test pattern using an optical sensor (block 212). In the illustrative embodiment of FIG. 1, the camera 160 generates one or more digital images of the region of the surface of the receiving member 102 that includes the test pattern formed from the extrusion material, such as the test patterns 400 of FIGS. 4A and 450 of FIG. 4B. In another embodiment, the depth sensor 164 generates scanned image data corresponding to a height profile generated at multiple locations in the print zone 140. For example, in one embodiment the controller 128 operates the X/Y actuators 150 to move the depth sensor 164 in a rasterized path over the receiving member 102 to generate a two-dimensional height profile of the swaths that form the test pattern on the surface of the receiving member 102.

The process 200 continues as the controller 128 identifies the cross-process direction locations of each swath in the first portion and the second portion of the printed test pattern based on the scanned image data (block 216). In the printer 100, the controller 128 identifies the cross-process direction locations of swaths in both the first and second portions of the printed test pattern that correspond to the first and second process directions using the scanned image data. In one embodiment, the controller 128 identifies the widths of different swaths in the cross-process direction using image processing techniques that are known to the art including, for example, edge-finding algorithms, automated image rotation, thresholding, profile fitting, and the like. The controller 128 then identifies the cross-process direction location of the swath as a center position between two identified lateral edges of the swath, where each lateral edge extends along the length of the swath in the process direction. In test pattern embodiments that include multiple printed swaths from each nozzle of the extruder, the controller 128 optionally averages the cross-process direction locations of multiple swaths to identify the cross-process direction location of the nozzle that produced the swaths. The controller 128 identifies the cross-process direction locations of the swaths in each portion of the test pattern, such as the portions 420 and 430 of the test pattern 400 or portions 470 and 480 of the test pattern 450, separately since each portion corresponds to a different predetermined process direction in the print zone 140.

In another embodiment, the controller 128 operates the X/Y actuators 150 to pass the displacement sensor 164 over the printed swaths of material in the test pattern in a direction that is perpendicular to each swath. The displacement sensor 164 generates a plurality of height measurements for a height profile of each swath including both of the lateral edges of the swath and a peak located at or near the center of the swath. The lateral edges of the swath refer to the edges that extend along the length of the swath, and the distance between the two lateral edges of each swath in a direction that is perpendicular to the length of the swath corresponds to the width of the swath. At each lateral edge of the swath, the swath has a height that matches or is very similar to the height of the underlying receiving member 102, which enables the controller 128 to identify the locations of two lateral edges of a swath and to generate a corresponding measurement of the width of the swath. The controller 128 then identifies the cross-process direction location of the swath as a location that bisects the two lateral edges of the swath.

In another embodiment of the process 200, the controller 128 identifies the cross-process direction locations of swaths in the test pattern using the displacement sensor 164 to measure the height of each swath in the test pattern. Since the shapes of the swaths have the greatest height at the center of each swath, the controller 128 identifies the relative cross-process direction location of a swath and a corresponding nozzle in the extruder 108 based on one or more locations along a cross-process direction axis for a given swath that have the maximum height values in the height profile data from the displacement sensor 164.

The process 200 continues as the controller 128 identifies a measured two-dimensional location of each nozzle in the extruder 108 that forms the printed test pattern relative to the location of the reference nozzle. The controller 128 identifies the two-dimensional relative location of the second nozzle based on identified cross-process direction locations of the swaths in both a first cross-process direction that is perpendicular to the first process direction and a second cross-process direction that is perpendicular to the second process direction in the scanned image data of the test pattern (block 220).

Using FIG. 4B as an example, the controller 128 uses the identified cross-process direction location of the reference nozzle 324E in the first portion of the test pattern 470 as an origin coordinate (e.g. 0 at the origin or another predetermined coordinate location) along the X axis, which is the first cross-process direction that is perpendicular to the first process direction (Y axis) in the first portion 470. The controller 128 then identifies the cross-process direction locations of the nozzles 324A and 324H (and optionally other nozzles in the extruder 108) based on the relative cross-process direction locations of the swaths 458 and 462, respectively. The controller 128 generates a numeric coordinate value for the measured location of the nozzle 324A relative to the reference nozzle 324E along the X axis using the relative cross-process direction location $W_{Y1}$ for the swath 458. Similarly, the controller generates another numeric coordinate value for the measured location of the nozzle 324H along the X axis using the relative cross-process direction location $W_{Y2}$ for the swath 462. The controller 128 also assigns positive and negative numeric values to the coordinates for each nozzle to identify nozzles that are located to the right (i.e. a positive coordinate value in one embodiment of the process 200) or to the left (i.e. a negative coordinate value in one embodiment of the process 200) of the reference nozzle 324E.

The controller 128 similarly identifies Y coordinate locations for the nozzles in the extruder 108 relative to the reference nozzle 324E based on the identified cross-process direction locations of swaths in the second portion 480 of the printed test pattern 450. In the second portion 480, the Y axis is the second cross-process direction that is perpendicular to the second process direction (X axis). Using FIG. 4B as an example, the controller 128 uses the identified cross-process direction location of the reference nozzle 324E in the second portion of the test pattern 480 as an origin coordinate (e.g. 0 at the origin or another predetermined coordinate location) along the Y axis. The controller 128 then identifies the measured cross-process direction locations of the nozzles 324A and 324H (and optionally other nozzles in the extruder 108) based on the relative cross-process direction locations of the swaths 478 and 482, respectively. The controller 128 generates a numeric coordinate value for the measured location of the nozzle 324A relative to the reference nozzle 324E along the Y axis using the relative cross-process direction location $W_{X1}$ for the swath 478. Similarly, the controller generates another numeric coordinate value for the location of the nozzle 324H along the Y axis using the relative cross-process direction location $W_{X2}$ for the swath 482. The controller 128 also assigns positive and negative numeric values to the coordinates for each nozzle to identify nozzles that are located above (i.e. a positive coordinate value in one embodiment of the process 200) or below (i.e. a negative coordinate value in one embodiment of the process 200) the reference nozzle 324E along the Y axis. For example, in FIG. 4B the controller 128 assigns the nozzle 324A a positive Y axis coordinate and the nozzle 324H a negative Y axis coordinate in one embodiment of the process 200.

The combined X and Y coordinates for each nozzle enable the controller 128 to identify the measured two-dimensional location of each nozzle in the extruder 108 relative to the location of the reference nozzle. Those of skill in the art will recognize that the printer 100 identifies the location of each nozzle along the X and Y axes using the cross-process direction locations of swaths that are perpendicular to the process direction of the extruder that produces the swaths in each portion of a test pattern. Put another way, the controller 128 identifies the X axis coordinates of nozzles based on the identified locations of swaths that are produced while the extruder 108 moves in the Y axis process direction and the controller 128 identifies the Y axis coordinates of nozzles based on the identified locations of swaths that are produced while the extruder 108 moves in the X axis process direction.

Process 200 continues as the controller 128 identifies the angle of extruder roll using a fitting process based on the identified two-dimensional coordinates of the nozzles in the extruder 108, and the predetermined geometric arrangement of the nozzles in the extruder 108 (block 224). More particularly, since the nozzles in the extruder 108 are each located at fixed distances from the reference nozzle, such as the fixed distances between the reference nozzle 324E and the nozzles 324A and 324H in FIG. 4A and FIG. 4B, the controller 128 identifies the angle of roll for the extruder by generating calculated positions for the nozzles in the extruder for multiple angles of roll θ using a trigonometric process to calculate the expected location of one more nozzles in the extruder in two-dimensions relative to the reference nozzle for different angles of roll. The controller 128 then compares the expected location of the nozzles in the extruder for the different angles of roll to the measured locations of the nozzles that the controller 128 identifies based on the locations of the swaths in the test pattern. The controller 128 identifies the angle of extruder roll for the extruder 108 using a calculated angle of roll that minimizes the error between the expected locations of one or more nozzles in the extruder and the actual measured locations of the nozzles in the extruder 108.

In one embodiment, the controller 128 performs a fitting process that identifies the angle of roll θ by minimizing the error between the coordinates for the measured two-dimensional locations of one or more nozzles relative to the reference nozzle and predetermined "ideal" coordinates for the same nozzles for the extruder 108 is properly aligned with an angle of roll of 0°. As described above, FIG. 4A depicts the extruder 108 with the predetermined angle of roll alignment of 0° that properly aligns all of the nozzles 324A-324I in the extruder 108 along both the X and Y process direction axes.

In the printer 100, the stored instruction data 134 stores the two-dimensional coordinates for each nozzle in the extruder 108 relative to at least one reference nozzle, such as the nozzle 324E that is depicted above. The controller 128 performs a fitting process that rotates a model of the extruder 108 by a candidate angle of roll $\theta_c$ and then identifies the error in the positions of the nozzles in rotated model of the extruder 108 in comparison to the measured two-dimensional coordinates for at least one nozzle relative to the reference nozzle. The controller 128 tests multiple candidate angle of roll values $\theta_c$ using an optimization process that minimizes the error between the positions of the nozzles in the extruder that are calculated based on the candidate roll value and the actually observed positions of the nozzles that the printer 100 generates during the process 200. The candidate angle of roll values $\theta_c$ are typically selected over a predetermined range of angle of rolls that the extruder 108 may encounter during practical operation of the printer 100. The controller 128 identifies the direction of the roll about the Z axis using both positive and negative angle s (e.g. a range of −45° to 45° for potential candidate extruder angle of rolls). In one embodiment, the controller 128 uses the following functions to identify the positional error between the two-dimensional nozzle locations from the candidate angle of roll $\theta_c$ and the measured X and Y coordinates for a given nozzle n in the extruder 108 based on a first error component along the X axis and a second error component along the Y axis:

$$\text{Error}_X(\theta_c)=(X_{i(n)}\cos(\theta_c)-Y_{i(n)}\sin(\theta_c)-X_{r(n)}$$

$$\text{Error}_Y(\theta_c)=(Y_{i(n)}\cos(\theta_c)-X_{i(n)}\sin(\theta_c))-Y_{r(n)}$$

In the equations above, $(X_{i(n)}, Y_{i(n)})$ are the predetermined or "ideal" two-dimensional location coordinates for a given nozzle n in the extruder 108 when the extruder 108 has zero roll. In the embodiment of the printer 100, the memory 132 stores the ideal two-dimensional location coordinates of all nine nozzles in the extruder 108, with the reference nozzle 324E being assigned the origin coordinates (0,0), and all other nozzle coordinates being relative to the reference nozzle 324E. The terms $(X_{r(n)}, Y_{r(n)})$ refer to the measured two-dimensional X and Y coordinates that the controller 128 generates from the scanned image data. If necessary, the controller 128 applies numeric scaling to normalize the numeric values of the predetermined and measured coordinates for the nozzles to measure the error. In the equations above, the cosine and sine functions translate the predetermined location of the nozzle along both of the X and Y axes from the original coordinates for the zero roll extruder configuration to match the expected location of these nozzles if the extruder 108 experiences roll by the candidate angle of $\theta_c$. Thus, the two components $\text{Error}_X$ and $\text{Error}_Y$ of the error correspond to the X axis and Y axis differences, respectively, between the position of a nozzle n when the extruder 108 has a candidate angle of roll $\theta_c$ and the measured position of the nozzle n.

During the process 200, the controller 128 performs an optimization process to generate multiple best-fit candidate angles $\theta_c$ to minimize the total error values depicted above. The optimization process identifies an angle $\theta_{roll}$ as the optimized or best-fit angle of roll to the observed two-dimensional locations of one or more nozzles in the extruder 108 relative to the reference nozzle. The optimization process selects multiple candidate angle of roll values $\theta_c$ to minimize the measured error components $\text{Error}_X$ and $\text{Error}_Y$, either individually or together as an aggregate error value sum or as sum-of-squares value for the individual error components $\text{Error}_X$ and $\text{Error}_Y$ along the X and Y cross-process directions, respectively. The controller 128 then uses the best fit angle of roll $\theta_{roll\ as}$ the identified angle of roll to determine if the extruder 108 is properly aligned or requires rotation about the Z axis to reduce or eliminate the angle of roll.

During the process 200, the controller 128 identifies the angle of roll using the optimization process to identify the angle of roll $\theta_{roll}$ that minimizes the error for at least one nozzle in the extruder 108 relative to the reference nozzle. In some embodiments the controller 128 performs an optimization process to minimize the total positional error for multiple nozzles in the extruder 108, which increases the accuracy of measuring extruder roll in some embodiments. For example, as illustrated in FIG. 4A and FIG. 4B, in some embodiments the printer 100 uses all of the nozzles in the extruder 108 to generate a test pattern and the controller 128 uses the identified two-dimensional coordinates for each of the non-reference nozzles, such as nozzles 324A-324D and 324F-324I in the extruder 108, as inputs to the optimization process to identify the extruder roll.

The optimization process described above to identify $\theta_{roll}$ may be performed using different optimization techniques. In one embodiment, the controller 128 uses a non-linear least-squares minimization process to that is known to the art to identify the candidate angle $\theta_{roll}$ that minimizes the squared values of the positional errors Error$_X$ and Error$_Y^2$. In another embodiment, the optimization process identifies an angle $\theta_{roll}$ that minimizes a sum-of-squares of each component in the errors (e.g. min(Error$_X^2$ Error$_Y^2$)). In yet another embodiment, the controller 128 uses a curve-fitting process to identify the angle of roll using the coordinates of the nozzles in the extruder 108 at different angle of rolls $\theta_c$ within a predetermined angular range to find a best-fit match to the measured two-dimensional coordinates for each nozzle from the test pattern.

If the extruder 108 is properly aligned with an angle of extruder roll of 0°, then the error equations produce a value of 0 error or a small error value that is within an operational tolerance range of the extruder 108 when the candidate angle of roll $\theta_c$ for the ideal angle is set to zero:

Error$_X(0) = (X_{i(n)} \cos(0) - Y_{i(n)} \sin(0)) - X_{r(n)} \approx 0$

Error$_Y(0) = (Y_{i(n)} \cos(0) - X_{i(n)} \sin(0)) - Y_{r(n)} \approx 0$

Thus, when the measured coordinates $(X_{r(n)}, Y_{r(n)})$ for the nozzle n in the extruder are effectively equal to the "ideal" coordinates for the same nozzle given the predetermined geometric arrangement of nozzles in the extruder, then the angle of roll is 0° or another small angle that is within the operating tolerance range of the extruder. In this configuration, the controller 128 identifies that the extruder is properly registered and that the extruder roll is suitable for operation (block 228). The configuration of the extruder 108 in FIG. 4A depicts the extruder with an angle of roll of zero with the proper registration to continue printing without requiring correction to the angle of roll of the extruder. The three-dimensional object printer 100 continues with an additive manufacturing process that uses the extruder 108 to form patterns of the extrusion material in three-dimensional objects using the properly aligned extruder 108 (block 236).

If the identified angle of roll $\theta_{roll}$ for the extruder 108 is outside of a predetermined operational range for the printer 100 (block 228), then the controller 128 uses the actuator 178 to rotate the extruder 108 about the Z axis to reduce or eliminate the identified roll and return the extruder 108 to a predetermined angular orientation with zero roll (block 232). In the printer 100, the controller 128 operates the actuator 178 to rotate the extruder 108 in the opposite direction of the identified angle of roll in the extruder 108. For example, if the extruder 108 has a roll $\theta_{roll}$=+10° (e.g. clockwise) then the controller 128 operates the actuator 178 to rotate the extruder 108 by −10° (e.g. counterclockwise) to return the extruder 108 to a zero roll alignment.

After correcting the angle of roll of the extruder 108 to return the nozzles in the extruder 108 to proper registration in the print zone 140, the printer 100 continues with additive manufacturing process to form three-dimensional printed objects using the extruder 108 with the proper roll alignment (block 236). While the embodiment of the process 200 that is depicted in FIG. 2 identifies and corrects the extruder roll based on a single printed test pattern, in another embodiment the printer 100 returns to the processing that is described above in conjunction with block 204 to perform the process 200 iteratively until the controller 128 identifies that the angle of roll of the extruder 108 is within the predetermined zero roll operational range. The process 200 iterates until the orientation of the extruder 108 is within the predetermined operational range for a predetermined orientation with the surface of the receiving member 102.

In embodiments of three-dimensional object printers that do not include the actuator 178, the controller 128 generates an output using, for example, a visual display device or network device to indicate the identified angle of roll for the extruder 108. In this embodiment, the process 200 provides an automated output to indicate the required manual adjustment for the extruder 108 or to indicate that the extruder 108 should be replaced. While the printer 100 moves the extruder 108 along the orthogonal X and Y axes to generate a test pattern to identify the extruder roll during the process 200, in some configurations the printer 100 moves the extruder 108 in different process directions during a subsequent additive manufacturing process. For example, in one configuration the printer 100 moves the extruder 108 along a curved process direction to form selected patterns of the extrusion material while forming a three-dimensional printed object even if the extruder 108 does not travel in a curved path during the process 200.

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:

1. A method operating a three-dimensional object printer comprising:

moving, with a first actuator, a multi-nozzle extruder in a first process direction within a print zone of the three-dimensional object printer;

operating at least a first nozzle and a second nozzle in a plurality of nozzles in the multi-nozzle extruder to emit a first swath and a second swath, respectively, of an extrusion material onto a surface of a receiving member in the print zone during the moving of the multi-nozzle extruder in the first process direction;

moving, with the first actuator, the multi-nozzle extruder in a second process direction within the print zone of the three-dimensional object printer, the second process direction being different than the first process direction;

operating at least the first nozzle and the second nozzle in the plurality of nozzles in the multi-nozzle extruder to emit a third swath and a fourth swath, respectively, of the extrusion material onto the surface of the receiving member in the print zone during the moving of the multi-nozzle extruder in the second process direction;

generating, with an optical sensor, scanned image data of the first swath, the second swath, the third swath, and the fourth swath;

identifying, with a controller, a measured two-dimensional location of the second nozzle relative to the first nozzle with reference to a first location of the second nozzle in a first cross-process direction corresponding to a location of the second swath relative to the first swath in the scanned image data, the first cross-process direction being perpendicular to the first process direction, and a second location of the second nozzle in a second cross-process direction corresponding to a location of the fourth swath relative to the third swath in the scanned image data, the second cross-process direction being perpendicular to the second process direction; and identifying, with the controller, an angle of roll for the multi-nozzle extruder with reference to the measured two-dimensional location of the second nozzle relative to the first nozzle and a predetermined geometric arrangement of the first nozzle and the second nozzle in the multi-nozzle extruder.

2. The method of claim 1 further comprising:
operating, with the controller, a second actuator operatively connected to the multi-nozzle extruder to rotate the multi-nozzle extruder by an angle corresponding to the angle of roll for the multi-nozzle extruder to reduce or eliminate the angle of roll.

3. The method of claim 2 further comprising:
operating, with the controller, the second actuator operatively connected to the multi-nozzle extruder to rotate the multi-nozzle extruder in a direction opposite of the angle of roll to reduce or eliminate the angle of roll.

4. The method of claim 1, the identifying of the angle of roll further comprising:
identifying, with the controller, a plurality of two-dimensional locations for the second nozzle relative to the first nozzle that correspond to a plurality of angles of roll for the multi-nozzle extruder within a predetermined range of angles;
identifying, with the controller, a plurality of errors, each error in the plurality of errors corresponding to a distance between one two-dimensional location in the plurality of locations for the second nozzle and the measured two-dimensional location of the second nozzle; and
identifying the angle of roll for the multi-nozzle extruder with reference to one angle of roll in the plurality of angle of rolls that corresponds a minimum error in the plurality of errors.

5. The method of claim 4, the identifying of the angle of roll further comprising a non-linear least-squares minimization process to identify the one angle of roll in the plurality of angle of rolls that corresponds to a minimum error in the plurality of errors.

6. The method of claim 4, the identifying of the angle of roll further comprising a sum-of-squares minimization process to minimize a sum-of-squares of a first component of each error corresponding to the first cross-process direction and a second component of each error corresponding to the second cross-process direction.

7. The method of claim 4, the identifying of the angle of roll further comprising a curve-fitting process to identify the one angle of roll in the plurality of angle of rolls that corresponds a minimum error in the plurality of errors.

8. The method of claim 1, the identifying of the measured two-dimensional location of the second nozzle further comprising:
identifying, with the controller, a first relative location of the first swath in the first cross-process direction corresponding to a location in a height profile in the scanned image data of a maximum height of the first swath; and
identifying, with the controller, a second relative location of the second swath in the first cross-process direction corresponding to another location in the height profile in the scanned image data of a maximum height of the second swath.

9. The method of claim 1, the moving of the multi-nozzle extruder in the second process direction further comprising:
moving, with the first actuator, the multi-nozzle extruder in the second process direction at a 90° angle relative to the first process direction.

10. A three-dimensional object printer comprising:
a multi-nozzle extruder including a plurality of nozzles;
a first actuator configured to move the multi-nozzle extruder in a first process direction and a second process direction within a print zone of the three-dimensional object printer, the second process direction being different than the first process direction;
an optical sensor; and
a controller operatively connected to the multi-nozzle extruder, the first actuator, and the optical sensor, the controller being configured to:
move the multi-nozzle extruder in the first process direction using the first actuator;
operate at least a first nozzle and a second nozzle in the plurality of nozzles in the multi-nozzle extruder to emit a first swath and a second swath, respectively, of an extrusion material onto a surface of a receiving member in the print zone during the moving of the multi-nozzle extruder in the first process direction;
move the multi-nozzle extruder in the second process direction using the first actuator;
operate at least the first nozzle and the second nozzle in the plurality of nozzles in the multi-nozzle extruder to emit a third swath and a fourth swath, respectively, of the extrusion material onto the surface of the receiving member in the print zone during the moving of the multi-nozzle extruder in the second process direction;
generate scanned image data of the first swath, the second swath, the third swath, and the fourth swath using the optical sensor;
identify a measured two-dimensional location of the second nozzle relative to the first nozzle with reference to a first location of the second nozzle in a first cross-process direction corresponding to a location of the second swath relative to the first swath in the scanned image data, the first cross-process direction being perpendicular to the first process direction, and a second location of the second nozzle in a second cross-process direction corresponding to a location of the fourth swath relative to the third swath in the scanned image data, the second cross-process direction being perpendicular to the second process direction; and
identify an angle of roll for the multi-nozzle extruder with reference to the measured two-dimensional location of the second nozzle relative to the first nozzle and a predetermined geometric arrangement of the first nozzle and the second nozzle in the multi-nozzle extruder.

11. The three-dimensional object printer of claim 10 further comprising:
a second actuator operatively connected to the multi-nozzle extruder; and
the controller being operatively connected to the second actuator and further configured to:
rotate the multi-nozzle extruder by an angle corresponding to the angle of roll for the multi-nozzle extruder using the second actuator to reduce or eliminate the angle of roll.

12. The three-dimensional object printer of claim 11, the controller being further configured to:
rotate the multi-nozzle extruder in a direction opposite of the angle of roll using the second actuator to reduce or eliminate the angle of roll.

13. The three-dimensional object printer of claim 10, the controller being further configured to:
identify a plurality of two-dimensional locations for the second nozzle relative to the first nozzle that correspond to a plurality of angles of roll for the multi-nozzle extruder within a predetermined range of angles;

identify a plurality of errors, each error in the plurality of errors corresponding to a distance between one two-dimensional location in the plurality of locations for the second nozzle and the measured two-dimensional location of the second nozzle; and identify the angle of roll for the multi-nozzle extruder with reference to one angle of roll in the plurality of angle of rolls that corresponds a minimum error in the plurality of errors.

14. The three-dimensional object printer of claim 13, the controller being further configured to:

identify the angle of roll using a non-linear least-squares minimization process to identify the one angle of roll in the plurality of angle of rolls that corresponds a minimum error in the plurality of errors.

15. The three-dimensional object printer of claim 13, the controller being further configured to:

identify the angle of roll using a sum-of-squares minimization process to minimize a sum-of-squares of a first component of each error corresponding to the first cross-process direction and a second component of each error corresponding to the second cross-process direction.

16. The three-dimensional object printer of claim 13, the controller being further configured to:

identify the angle of roll using a curve-fitting process to identify the one angle of roll in the plurality of angle of rolls that corresponds a minimum error in the plurality of errors.

17. The three-dimensional object printer of claim 10, the controller being further configured to:

identify a first relative location of the first swath in the first cross-process direction corresponding to a location in a height profile in the scanned image data of a maximum height of the first swath; and identify a second relative location of the second swath in the first cross-process direction corresponding to another location in the height profile in the scanned image data of a maximum height of the second swath.

18. The three-dimensional object printer of claim 10, the controller being further configured to:

move the multi-nozzle extruder using the actuator in the second process direction at a 90° angle relative to the first process direction.

* * * * *